L. & J. COOPER.
BICYCLE SHADE.
APPLICATION FILED OCT. 23, 1907.
972,063.
Patented Oct. 4, 1910.
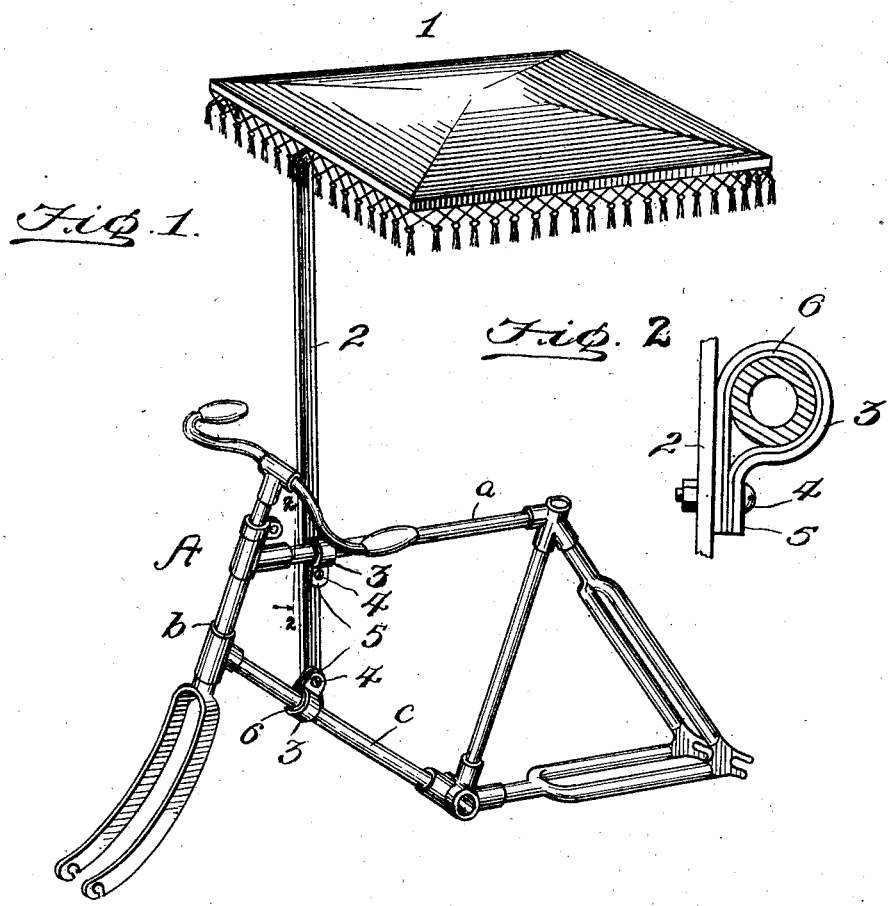
Witnesses
J. T. L. Wright
[signature]
Inventors
Leonard Cooper,
John Cooper,
By Victor J. Evans
Attorney

UNITED STATES PATENT OFFICE.

LEONARD COOPER AND JOHN COOPER, OF ADEL, GEORGIA.

BICYCLE-SHADE.

972,063. Specification of Letters Patent. Patented Oct. 4, 1910.

Application filed October 23, 1907. Serial No. 398,805.

*To all whom it may concern:*

Be it known that we, LEONARD COOPER and JOHN COOPER, citizens of the United States, residing at Adel, in the county of Berrien and State of Georgia, have invented new and useful Improvements in Bicycle-Shades, of which the following is a specification.

This invention relates to improvements in canopies, for bicycles, its object being to provide a light cheap and effective shelter which is readily attached to or detached from the frame of a bicycle and held rigidly and securely when placed in position upon the frame.

With these and other objects in view the invention resides in the novel construction of devices hereinafter fully described and claimed.

In the drawings, Figure 1 is a perspective view showing our invention applied to the frame of a wheel. Fig. 2 is an enlarged section on the line 4—4 of Fig. 1.

In the drawings A designates a bicycle frame of any well known or desired construction, *a* the top tube, *b* the crown fork and *c* the reach tube.

The canopy 1 is mounted upon a suitable frame of any desired construction, and is provided with the depending supporting bar 2, having the clamps 3, by which the device is secured to the frame A of the bicycle. Two of these clamps 3 are employed in this invention, one of which is secured around the top tube *a* of the bicycle frame while the other clamp encircles the reach tube *c* of the frame,, thus effectively securing the supporting bar at two separate portions of the frame. The clamps 3 are pivotally secured to the supporting bar 2, whereby they may assume any angle in relation to the bar and allow the bar to maintain a direct vertical position when secured to the frame of the wheel. Said clamps may be also adjusted longitudinally in reverse directions, within certain limits, on the top and reach tubes of the bicycle frame to dispose the supporting bar and hence also the canopy in a tilted or inclined position either forward or rearwardly as will be understood, and by tightening the bolts 4, said clamps may be readily secured in such adjusted position.

Each of the clamps 3 is constructed of a single piece of spring metal bent at the center to pass around one of the tubes of the bicycle frame and having its ends extended at right angles with reference to such tube and disposed one beside the other or in overlapping relation as at 5. A pad or cushion 6 of suitable elastic material is placed on the inside of the clamp to extend nearly around the tube and to also extend between the end of the clamp. This pad or cushion bears directly against the bicycle frame tube and prevents it from being scratched. It also increases the frictional grip of the clamp. One of the ends of the clamp bears directly against one side of the supporting bar 2 and the ends of the clamp are secured together and pivotally secured to said supporting bars by means of a bolt 4. By tightening this bolt the clamp may be tightened on the bicycle frame tube and by loosening the bolt the grip on the clamp of said tube will be released as will be understood. The elastic pad portions between the ends of the clamp enable said ends to be moved toward and from each other by the action of the bolt to vary the pressure or tension of the clamp of the tube as may be desired.

It will be seen by this construction we have provided a simpler and efficient canopy for bicycles, which can be readily attached to or detached from the frame of any bicycle and which will adapt itself to the various inclination of reach tubes upon the frame of the bicycle.

Having thus fully described the invention, what is claimed as new is:

In combination with a bicycle frame having a top tube and a reach tube, said tubes being disposed at an angle with relation to each other, a canopy having a supporting bar, and clamps pivotally connected to said supporting bar and respectively engaging said top tube and said reach tube, each of said clamps comprising a strip of spring material having its central portion bent around one of said tubes and having its ends disposed in overlapping relation, one end of said strip being straight, tangentially with respect to said tube and bearing against said canopy supporting bar, a cushion on the inner side of said clamp between the same and the tube and comprising a strip coextensive in length with said strip of spring material and having its ends extending between the ends of said clamp, and a bolt connecting the clamp ends together, also extending through the ends of the cushion strip and through the said supporting bar and serving to pivotally connect the clamp to the bar and to enable the clamp and, hence, also the cushion strip to be tightened and loosened on said frame tube.

LEONARD COOPER.
JOHN COOPER.

Witnesses:
 HUGH ABRAHAM,
 SOLOMON McMILLAN.